C. E. LUTZ.
ADJUSTABLE CONE FOR FERTILIZER FEED.
APPLICATION FILED JULY 17, 1911.

1,024,796.

Patented Apr. 30, 1912.
2 SHEETS—SHEET 1.

Charles E. Lutz
Inventor,

Witnesses by C. A. Snow & Co.
Attorneys.

C. E. LUTZ.
ADJUSTABLE CONE FOR FERTILIZER FEED.
APPLICATION FILED JULY 17, 1911.
1,024,796.
Patented Apr. 30, 1912.
2 SHEETS—SHEET 2.
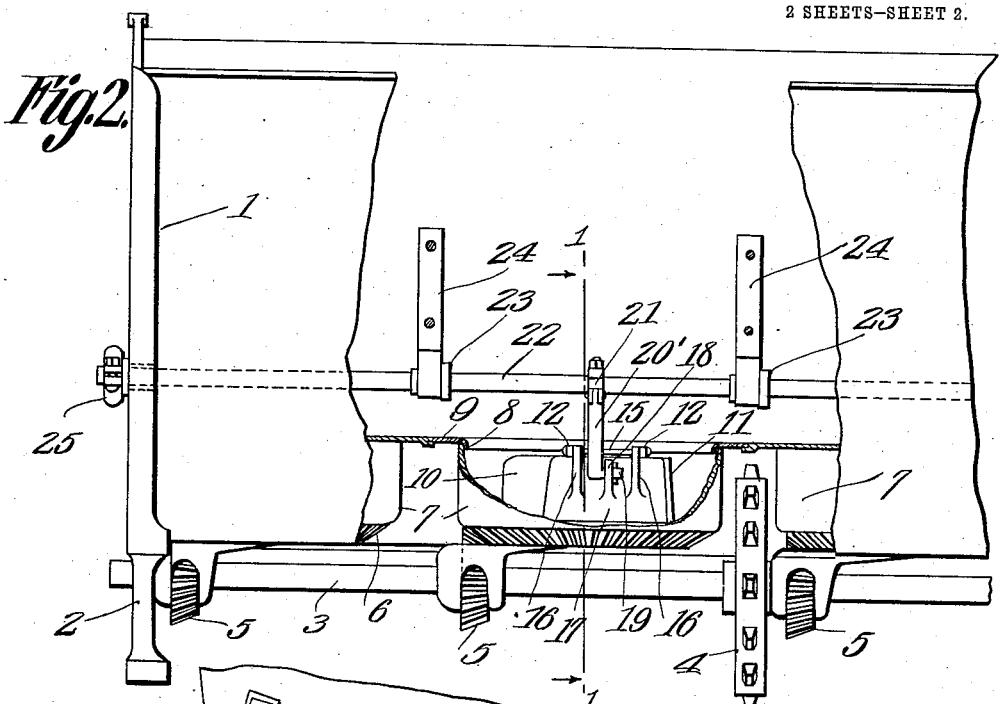
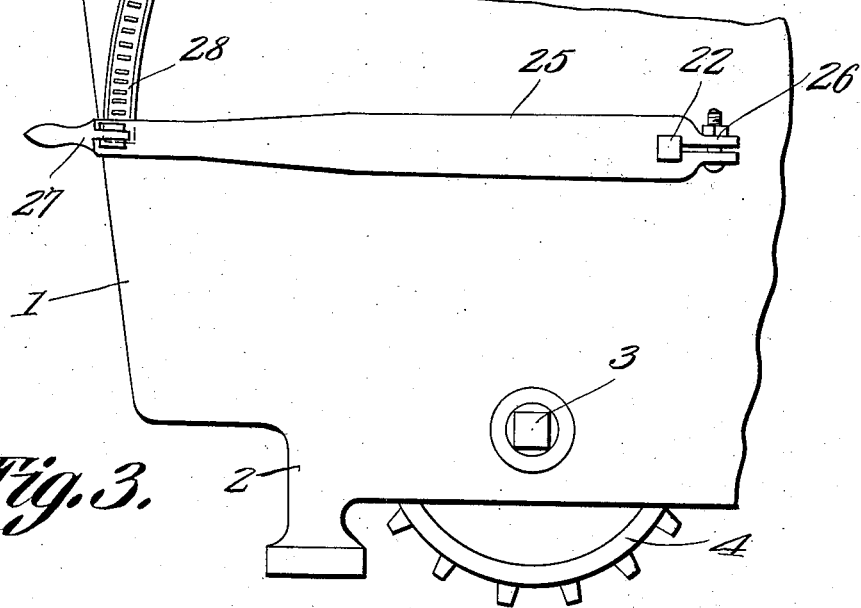
Charles E. Lutz,
Inventor,
Witnesses
by C. A. Snow & Co.
Attorneys.

UNITED STATES PATENT OFFICE.

CHARLES E. LUTZ, OF MARION, INDIANA.

ADJUSTABLE CONE FOR FERTILIZER-FEED.

1,024,796.　　　　　Specification of Letters Patent.　　Patented Apr. 30, 1912.

Application filed July 17, 1911. Serial No. 638,927.

*To all whom it may concern:*

Be it known that I, CHARLES E. LUTZ, a citizen of the United States, residing at Marion, in the county of Grant and State of Indiana, have invented a new and useful Adjustable Cone for Fertilizer - Feed, of which the following is a specification.

This invention relates to improvements in adjustable cones for fertilizer feeds, and the primary object of this invention is the provision of a novel form of mechanism disposed with relation to the cone of a fertilizer feed so as to regulate to a nicety the feed of the fertilizer to the drill spouts of a grain drill, combined with mechanism for regulating the same and retaining the same at the desired adjustment.

A further object of this invention is the provision of an adjustable attachment adapted to be connected to a cone of a fertilizer feed and so disposed as to regulate the size of the discharge opening therethrough, without in any way interfering with the feed of the fertilizer and at the same time in securing the absolute and desired feed of the fertilizer through the cone into the distributing spouts of the drill.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

Figure 4:
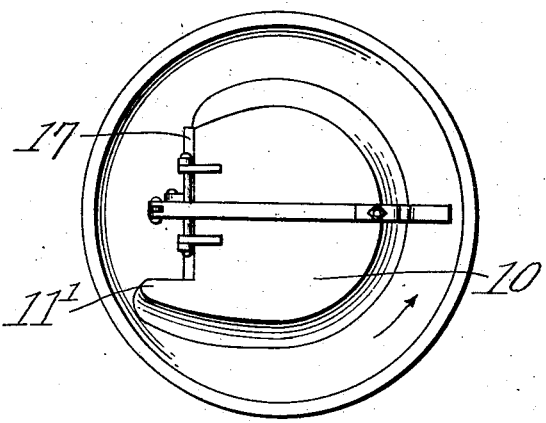
Figure 1:
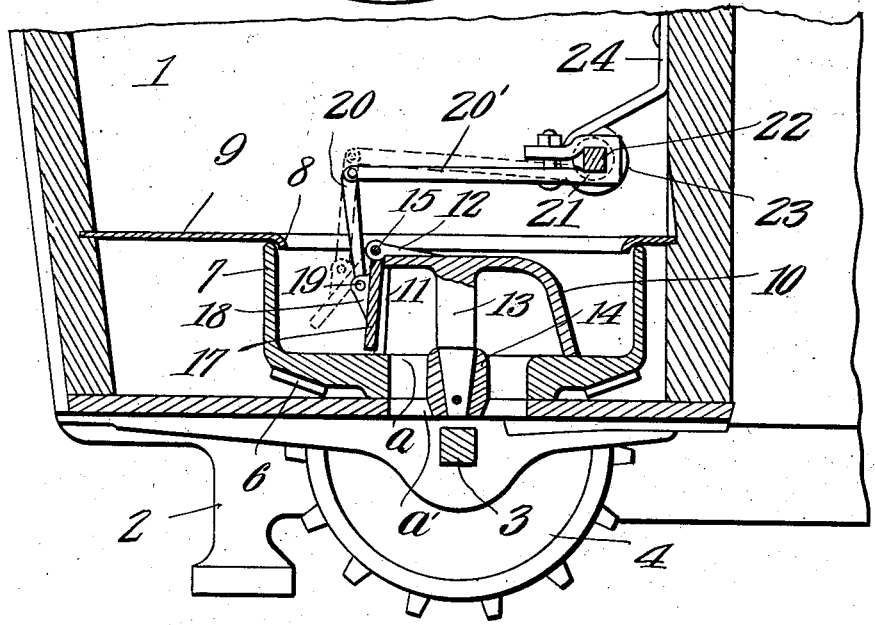

In the drawings—Figure 1 is a sectional view on line 1—1 of Fig. 2 through the hopper showing the cone and cylinder in operable relation, full lines showing the pivoted gate or valve closed and dotted lines showing the same open. Fig. 2 is a rear elevation of the hopper with a portion of the same broken away showing the series of the cones in operable relation, the center cylinder of the feed being shown in sections with the parts in operable relation thereto. Fig. 3 is an end elevation of the hopper showing the lever for regulating and holding the valve in the respective cones. Fig. 4 is a top plan view of the cone and valve in operable position.

Referring to the drawings, the numeral 1 designates the hopper which is provided with the downwardly projecting hangers 2 for the journaling of the transverse shaft 3, which has mounted thereon the power feeding and transmitting sprocket wheel 4, and a series of bevel pinions or gears 5, one to each feed of the hopper. These bevel gears 5 are in mesh at all times with the geared portion 6 of the respective rotatably mounted cylinders or drums 7, which are made in the shape of a cup and have their upper ends without the annular lip or flange 8 of the bottom 9 of the fertilizer receptacle, the said cylinder 7 being so disposed as to receive the fertilizer from the hopper over the lip or flange 8 into the receptacle portion of the cylinder.

Disposed within each of the cylinders 7 is a cone 10, which is provided with the aperture 11, in one wall thereof, and upon its top adjacent thereto with the two eyed lugs or bosses 12, said cone being provided with the cylindrical support 13 which is mounted in the boss 14 and held in rigid relation to the revoluble cylinder or drum 7, the said cylinder or drum 7 being provided with the aperture or annular space $a$ which is adapted to aline with the aperture $a'$ which permits the fertilizer within the cylinder to be fed through the opening 11 of the cone to the desired drill spout.

Passing through the eyed lugs 12 is a pin 15, which forms a pivot for the eyed lugs or arms 16 formed integrally with the valve or gate 17, which is so disposed as to be moved to and from the aperture 11 of the cone and have its lower edge parallel with the adjacent wall of the cone thus rendering the aperture larger adjacent its lower portion and so that the fertilizer will be guided into the aperture 11 by means of the projecting wall or portion 11' of the cone 10 as clearly shown in Figs. 2 and 4.

Formed integral with and projecting centrally of the arms 16 is an eyed lug or boss 18, which has pivoted therein a pin 19 of the link 20 connected to the arm 20', whose clamp 21 is adapted to surround the rectangular shaft 22 and clamp the said arm 20' with relation thereto so that the manipulation of the shaft 22 will actuate the arm 20' and raise or lower the gate or valve 17. This shaft 22 is provided with a series of antifrictional collars 23 which are journaled in the brackets 24 secured to the wall of the hopper 1, and upon the outer end of the shaft 22 is a shaft operating lever 25, the same being connected to the squared end of the shaft 22 by means of the clamp 26, the said lever 25 being provided with a handle portion 27 and with co-acting means to engage the segmental or toothed plate 28 upon the side of the hopper, to lock and retain the lever 25 and consequently the gate or valve 17 in the desired adjustment with relation to the opening 11 of the cone 10, the same being fully illustrated in full and dotted lines in Fig. 1.

By locating the valve or gate 17 in the wall of the cone proper instead of the projection 11', the fertilizer is not permitted to crowd against the valve or gate, but passes up both sides and below the lower edge and longitudinally of the valve or gate, the wall 11' guiding the fertilizer through the aperture 11, and thus relieving all strain or torsion upon the hinges and operating mechanism of the valve or gate 17.

From the foregoing description it is evident that an adjusting device is provided for a series of cone feeds used in connection with fertilizer attachments for grain drills, and that by the simple manipulation of the lever 25, all of the gates or valves upon the respective cones are operated simultaneously for feeding the desired quantity of fertilizer through the aperture 11 of said cones to the grain or fertilizer spouts of the drill.

What is claimed is:

1. The combination of a hopper, a rotary cylinder, a stationary cone mounted in the cylinder and providing an annular channel about the cone, said cone having one wall cut vertically and provided with an aperture substantially in line with the path of travel of the fertilizer in the annular channel, a projection carried by the cone adjacent one end of the vertical wall and projecting to restrict the annular channel at the far side of the aperture, a closure hinged to the top of the cone to swing into and out of aperture closing position, and means for operating said closure.

2. The combination of a hopper, a rotary cylinder, a stationary cone mounted in the cylinder and providing an annular channel about the cone, said cone having one wall cut vertically and provided with an aperture substantially in line with the path of travel of the fertilizer in the annular channel, a projection carried by the cone adjacent one end of the vertical wall and projecting to restrict the annular channel at the far side of the aperture, a pair of lugs formed integral with the top of the cone and projecting beyond the vertical wall, a closure provided with lugs adapted to register with the lugs of the cone and disposed to normally close the aperture by gravity, and means connected to the closure for swinging the same away from the aperture and out into the annular channel.

3. The combination of a hopper, a rotary cylinder, a stationary cone mounted in the cylinder and providing an annular channel about the cone, said cone having one wall cut vertically and provided with an aperture substantially in line with the path of travel of the fertilizer in the annular channel, a projection carried by the cone adjacent one end of the vertical wall and projecting to restrict the annular channel at the far side of the aperture, a closure of substantially the same length as the vertically cut wall having its upper edge hingedly connected to the top of the cone and disposed to swing to and from the vertical wall of the cone with one edge abutting the projection, and means for actuating the closure.

4. The combination of a hopper, a rotatable cylinder therein, a stationary U-shaped in plan cone provided with an aperture in the flat wall thereof, said cone being mounted within the cylinder to provide a fertilizer conducting channel around the cone, a projection formed upon the flat wall of the cone at one end thereof and projecting outwardly to restrict the channel about the cone at that point and act as a means to guide the fertilizer to the aperture of the cone, a closure hinged to the upper edge of the flat wall of the cone and having one edge acting substantially against the projection to coact therewith in guiding the fertilizer through the aperture, and means for actuating and holding the closure at the desired adjustment.

In testimony that I claim the foregoing as my own, I have hereto affixed my signature in the presence of two witnesses.

CHARLES E. LUTZ.

Witnesses:
 FRANK W. WHITE,
 JOHN H. THOMPSON.